V. E. FAGERSTROM.
CAKE TURNER.
APPLICATION FILED APR. 5, 1916.
1,237,317. Patented Aug. 21, 1917.
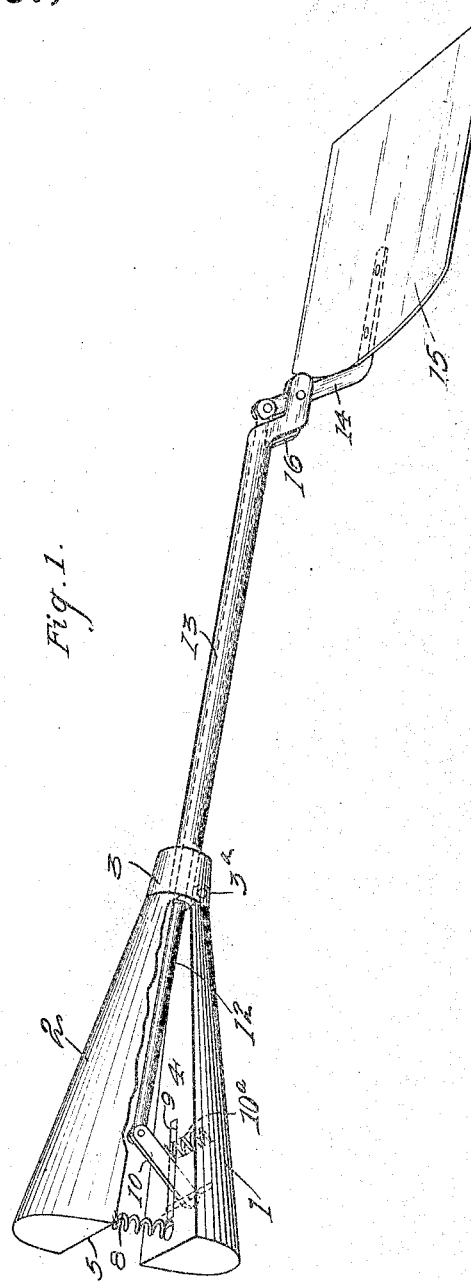
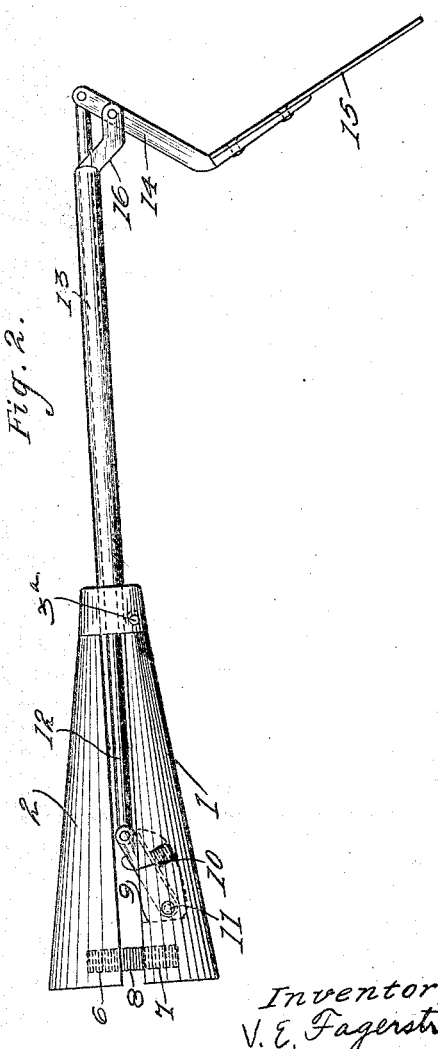

UNITED STATES PATENT OFFICE.

VALFRID EMANUEL FAGERSTROM, OF DULUTH, MINNESOTA.

CAKE-TURNER.

1,237,317.  Specification of Letters Patent.  Patented Aug. 21, 1917.

Application filed April 5, 1916. Serial No. 89,112.

*To all whom it may concern:*

Be it known that I, VALFRID E. FAGERSTROM, a citizen of Sweden, residing at Duluth, in the county of St. Louis and State of Minnesota, have invented certain new and useful Improvements in Cake-Turners, of which the following is a specification.

This invention relates to improvements in cake turners and its object is to produce a device of this class that is simple in construction and operation and cheap to manufacture. With the foregoing and other objects in view the invention consists in the combination and arrangement of parts to be hereinafter fully described in the following specification, pointed out in the appended claim and illustrated in the accompanying drawing which forms a part of said specification and in which—

Figure 1 is a perspective view of my improved cake turner.

Fig. 2 is a view in side elevation.

Like reference characters denote corresponding parts in both views.

My invention comprises a handle composed of the separate companion members 1, 2 which are connected by the hub 3, the former member being hinged thereto at $3^a$. The members 1, 2 are formed with relatively adjacent flat faces 4, 5 in which the oppositely disposed recesses 6, 7 are formed to receive the ends of the spiral expansion spring 8 the purpose of which is to yieldingly retain the handle members 1, 2 the maximum distance apart. An elongated recess 9 is formed in the face 4 to receive a link 10 one end of which is pivotally arranged upon a transverse pin 11 arranged in the said handle member 1 and passing through the said recess 9; the upper end of said link 10 being pivotally secured to a reach rod 12 which extends through a perforation in the hub 3 and through a bore in a stem 13 carried by said hub, the opposite end of said rod 12 being pivotally connected to the shank 14 of the blade 15, said shank being pivotally suspended in the angular bifurcated end 16 of the stem 13.

The operation of the device is as follows: When the handle members 1, 2 are pressed together against the tension of the spring 8 the member 2 bears against the reach rod 12 and link 10 and forces both toward the blade-end of the device moving the blade into the position shown in Fig. 2 and turning the cake, which has previously been raised from the griddle upon said blade by inserting that member beneath the cake, in a quick and satisfactory manner. When pressure is removed from the handle members 1, 2 they will, through the medium of spring 8, again assume the position shown in Fig. 1.

What is claimed is:—

In a cake turner, a handle comprising a hinged member and a relatively fixed member; said hinged member being formed with a longitudinal recess, means for yieldingly retaining said members the maximum distance apart, a pin extending transversely through the recessed portion of said hinged member, a hollow stem connected to said handle and having an angular bifurcated termination, a blade, a shank carrying said blade and pivotally disposed in the bifurcated end of said stem, a reach rod movably disposed in said stem and connected to said shank, and a spring-pressed link connecting said reach rod and the aforesaid pin and disposed in the recessed portion of said hinged handle member whereby movement of said member with relation to the fixed handle member will impart movement to said reach rod.

In testimony that I claim the foregoing as my own I have hereto affixed my signature in the presence of two subscribing witnesses.

VALFRID EMANUEL FAGERSTROM.

Witnesses:
S. MORTEMD,
J. A. MORTEMD.